United States Patent [19]

D'Agostino et al.

[11] 4,012,303
[45] Mar. 15, 1977

[54] TRIFLUOROSTYRENE SULFONIC ACID MEMBRANES

[75] Inventors: Vincent F. D'Agostino, Huntington Station; Joseph Y. Lee, Lake Grove; Edward H. Cook, Jr., Lewiston, all of N.Y.

[73] Assignees: Hooker Chemicals & Plastics Corporation, Niagara Falls; RAI Research Corporation, Hauppauge, both of N.Y.

[22] Filed: Dec. 23, 1974

[21] Appl. No.: 535,636

[52] U.S. Cl. .......................... 204/159.17; 204/296; 429/192; 260/884
[51] Int. Cl.² .................... C25B 13/08; H01M 8/10
[58] Field of Search .................... 204/296, 159.17; 136/86 R, 86 F; 260/884

[56] References Cited
UNITED STATES PATENTS

| | | | |
|---|---|---|---|
| 3,298,942 | 1/1967 | Magat | 204/159.17 |
| 3,341,366 | 9/1967 | Hadgdon et al. | 136/86 R |
| 3,839,172 | 10/1974 | Chapiro | 260/884 |
| 3,878,072 | 4/1975 | Cook | 204/296 |

Primary Examiner—John H. Mack
Assistant Examiner—H. A. Feeley

[57] ABSTRACT

This disclosure is directed to fluorocarbon polymers, polymeric membranes, and electrochemical cells and processes. The polymers and membranes are produced by radiation techniques to provide improved products. For example, $\alpha,\beta,\beta$-trifluorostyrene in an inert organic solvent is grafted onto an inert film, such as tetrafluoroethylene-hexafluoropropylene copolymer, by irradiation, i.e. with Co-60 gamma radiation at a dose of several Mrad. The grafted film is then sulfonated, preferably in a chlorosulfonic acid bath. The resulting film is useful as a membrane or diaphragm in various electrochemical cells such as chlor-alkali or fuel cells.

12 Claims, 1 Drawing Figure

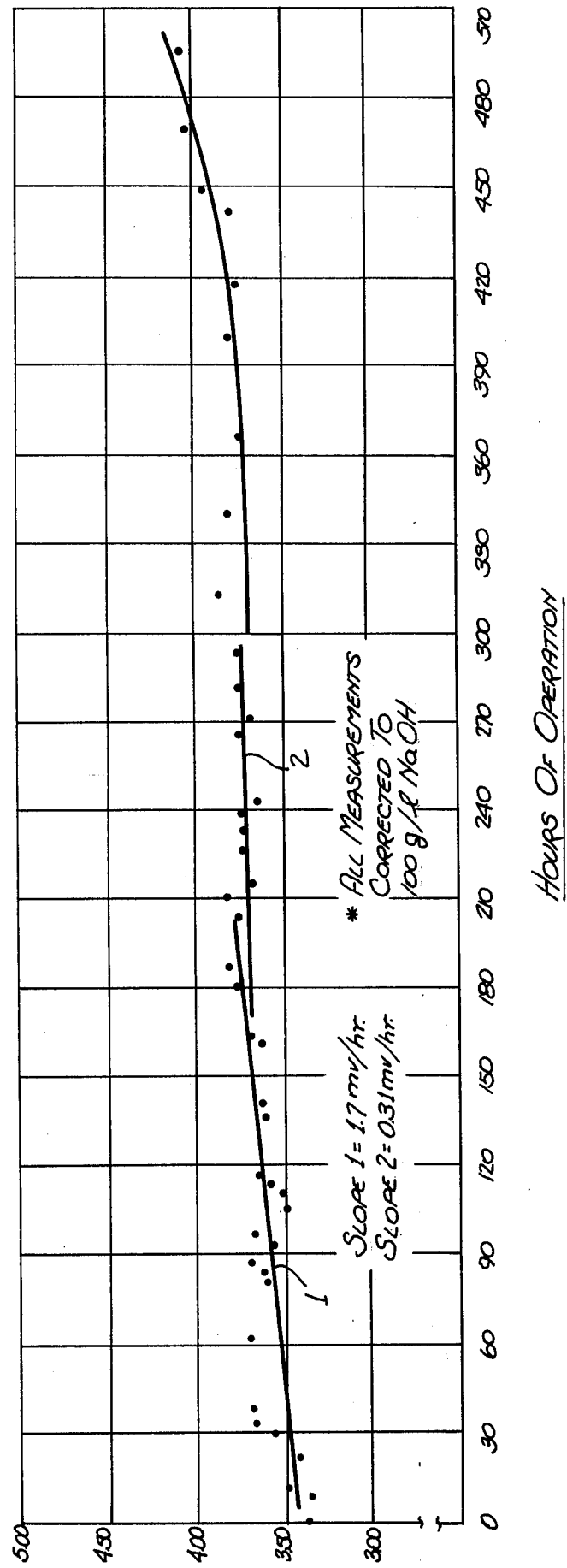

TRIFLUOROSTYRENE SULFONIC ACID MEMBRANES

BACKGROUND

Chlorine is produced almost entirely by electrolytic methods, primarily from aqueous solutions of alkali metal chlorides. In the electrolysis of brines, chlorine is produced at the anode, and hydrogen, together with an alkali metal hydroxide, such as sodium or potassium hydroxide, at the cathode. As the anode and cathode products must be kept separate, many cell designs have been developed. These designs have generally utilized either a diaphragm, or a mercury intermediate electrode to separate the anolyte and catholyte compartments.

In the diaphragm process, brine is fed continuously into the electrolytic cell and flows from the anode compartment through an asbestos diaphragm into the catholyte compartment which contains, for example, an iron cathode. To minimize back-diffusion and migration, the flow rate is always such that only part of the salt is converted. The hydrogen ions are discharged from the solution at the cathode, forming hydrogen gas and leaving hydroxyl ions. This catholyte solution, which contains sodium hydroxide and unchanged sodium chloride, is evaporated to obtain the sodium hydroxide. In the course of the evaporation the sodium chloride precipitates, is separated, redissolved, and sent back into the electrolytic cell. The function of the diaphragm is to maintain the level of concentration of alkali, to minimize the diffusional migration of hydroxyl ions into the anolyte and to maintain separation of hydrogen and chlorine. The diaphragm should also have minimal electrical resistance.

In the mercury electrode process, the cation, after discharge, forms an alloy or amalgam with mercury. The amalgam flows or is pumped to a separate chamber in which it is allowed to undergo galvanic reaction, most often with water, to form hydrogen and a comparatively strong sodium hydroxide solution containing almost no sodium chloride.

The diaphragm process is inherently cheaper than the mercury process, but as the former process does not provide chloride-free alkali, additional processing steps are necessary to purify and concentrate the alkali.

Substitution of an ion-exchange membrane material for the diaphragm has been proposed. Numerous membrane materials have been suggested. For example, membranes are described in U.S. Pat. Nos. 2,636,851; 2,967,807; 3,017,338; and British Patent Nos. 1,184,321 and 1,199,952.

Such membranes are substantially impervious to hydraulic flow. During operation, brine is introduced into the anolyte compartment wherein chlorine is liberated. Then, in the case of a cation permselective membrane, sodium ions are transported across the membrane into the catholyte compartment. The concentration of the relatively pure caustic produced in the catholyte compartment is determined by the amount of water added to this compartment from an external source, and by migration of water, in the cell, i.e. osmosis and/or electro-osmosis. While operation of a membrane cell has many theoretical advantages, its commercial application to the production of chlorine and caustic has been hindered owing to the often erratic operating characteristics of the cells. A number of disadvantages have been present when using these membranes, including a relatively high electrical resistance, poor permselectivity and oxidative degeneration.

In membrane-type fuel cells, a fuel, such as hydrogen or a material which decomposes to hydrogen, is oxidized in an oxidation zone or chamber giving up electrons to an anode. The hydrogen ions formed migrate by means of an ion-exchange resin to the reduction zone or chamber where they combine with oxygen gas from an oxidant reduced at the cathode. Water, which contains a minor amount of a peroxide by-product, is discharged from the cell. Thus, both material and electrical charge balances are maintained as electrons flow from the anode to the cathode. This electron flow can be utilized to provide useful electrical energy. Numerous types of membranes have been proposed for use in fuel cells including polymers of $\alpha, \beta, \beta$-trifluorostyrene (U.S. Pat. No. 3,341,366) and copolymers of trifluorovinyl sulfonic acid (British Pat. No. 1,184,321).

It is an object of this invention to provide an improved cation permselective membrane for use in chlor-alkali cells and fuel cells which has a low electrical resistance and a high resistance to hydroxyl migration. It is a further object to provide a membrane which is particularly resistant to oxidative degradation, particularly in chlorine and peroxide environments.

It is a still further object to provide chlor-alkali cells of the diaphragm type with improved electrical properties and which prevent chloride contamination of the catholyte material. And it is an object to provide improved fuel cells of the ion-exchange membrane type.

It is also an object of this invention to provide a novel method for the preparation of membranes and the use of such membranes in electrochemical cells. Further objects will become apparent to one skilled in the art from the following detailed specification and the appended claims.

THE INVENTION

This invention relates to novel polymeric membranes, the method of making the membranes, and their use in electrochemical cells such as a diaphragm type chlor-alkali cell and an ion-exchange type fuel cell. Radiation techniques are used for the polymerization of perfluoro-olefinic monomers, and for the grafting of such monomers onto base films for use in electrochemical cells.

The electrochemical cells in which the membrane described herein is to be used, are similar to previously used cells, subject to the modifications described herein. Generally, an enclosure is provided which is defined into a catholyte and anolyte compartment by the membrane material. In a chlor-alkali diaphragm cell, the catholyte compartment contains an appropriate cathode, generally a metallic material, such as iron. The anolyte compartment contains a conductive electrolytically-active anode, such as graphite or more desirably, a metallic anode having a valve metal substrate, such as a titanium, bearing a coating which contains a precious metal, precious metal oxide or other electrocatalytically active corrosion-resistant material or mixtures thereof. The anolyte compartment is provided with an outlet for generated chlorine gas, an inlet for brine solution and an outlet for depleted brine. Similarly, the catholyte compartment will have outlets for liquid (caustic) and gaseous (hydrogen) products and generally, an inlet through which water and/or sodium hydroxide solution may be added initially. Multicompartment cells may also be used, which have one or more buffer compartments, porous sheets and cationic membranes.

In operation, a direct current is passed between the electrodes causing the generation of chlorine at the anode and the selective transport of hydrated sodium ions across the membrane into the catholyte compartment wherein they combine with hydroxide ions formed at the cathode by the electrolysis of water.

The improved membrane of this invention is manufactured by the process of radiation grafting a fluorinated vinyl compound, such as $\alpha, \beta, \beta$-trifluorostyrene (TFS), onto an inert polymeric film, and then sulfonating the membrane. The preparation of membranes by radiation grafting techniques has the advantage of permitting the use of a wide variety of film bases which may be tailored for the desired end-use, and the flexibility of grafting to the base a predetermined quantity of functional groups. Moreover the membranes made by this technique do not require the use of fillers and plasticizers which are used when fabricating membranes from conventionally made polymers, such as poly $\alpha, \beta, \beta$-trifluorostyrene. The membranes made by this invention are therefore homogeneous, integral films which are directly usable in electrochemical cells.

The choice of base film material to which the fluorinated vinyl compounds of this invention can be grafted should be chosen from polymeric film materials which are resistant to oxidative degradation. For example, grafting can be carried out on films of polymers of ethylene, propylene, tetrafluoroethylene (TFE), trifluorochloroethylene, and other halogenated olefinically unsaturated monomers preferably having 2–3 carbon atoms and films of copolymers of these monomers such as copolymers of tetrafluoroethylene-hexafluoropropylene (FEP) and TFE-ethylene. It has been found that it is preferable to utilize fluorocarbon base films rather than hydrocarbon base films. Such films are somewhat more inert, particularly under long-term and extreme conditions. In many instances, the desired end use of the membrane will dictate the choice of base film. For example, when the membrane is to be used in a chlor-alkali cell, the fluorocarbon base films should be used, as the other films will be degraded by the chlorine which is produced during operation of the cell.

At the present, FEP film is convenient for commercial use; it is readily available as a staple article in commerce in 48 inch width rolls, while TFE is not so available. A laminate of FEP films, TFE films, or a combination may be used. A three layer laminate having a layer of TFE cloth sandwiched between two layers of FEP is an example of a useful membrane material. It may also be desirable to utilize a supported film. For example, the film material may be supported and laminated to a polymeric cloth, woven mesh, perforated sheet or foraminous support member to provide greater mechanical strength. The following description of the invention will be illustrated using FEP film as the base material.

The thickness of the base film for grafting purposes is not critical. However, generally a greater percentage of graft is obtained when using a thinner film under similar conditions. As with the choice of film material, the choice of film thickness will depend on the end use of the membrane. The electrical resistance of the finished membrane is generally lower when starting with a thinner film, due to the greater percentage of grafting when utilizing the thinner films. If similar graft percentages are obtained for thick and thin films, then the electrical resistances of each will be approximately equal. FEP films ranging in thickness from ½ to 20 mils, perferably about 2 mils to about 5 mils, provide satisfactory base films for use in chlor-alkali cells. There is substantially no hydroxyl migration from the catholyte to the anolyte compartments when using a 5 mil film. Generally, films having a thickness of up to 10 mils are useful in fuel cells where greater mechanical strength or resistance to back-pressure is required.

The monomeric materials to be grafted onto the base film generally comprise one or more fluorinated vinyl compounds such as perfluoro alkenyl aromatic monomers. These monomers may be depicted by the general formula:

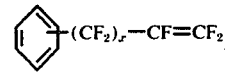

wherein $x$ is an integer from zero to eight and the expression $(CF_2)x$ includes linear and branched-chain perfluoroalkyl groups. These are compounds which have had all of the non-aromatic carbon-hydrogen bonds replaced by carbon-fluorine bonds. It has been found that under extreme oxidative conditions such as are found in chlor-alkali and fuel cells, primary degradation of the material occurs at the C-H bonds. Membranes made from these fluorinated compounds will have a much greater lifetime than those containing C-H bonds. As C-H bonds on an aromatic ring are resistant to oxidation, the presence of non-fluorinated aromatic moities in the monomer are not detrimental. The foregoing monomers, or mixtures thereof, may be directly grafted onto the base film and then sulfonated, or the monomers may first be sulfonated and then grafted onto the base film. The aromatic groups provide ready sites for sulfonation by procedures described below. Alternatively sulfonated fluoroalkenyl monomers may be used. These monomers are preferably prepared in the sulfonated form and then grafted onto the base film. For example, one or more monomers of the general formula.

$$F(CF_2)_x\ CF = CF\ SO_2F$$

wherein $(CF_2)_x$ is as defined above, may be grafted onto a base film and then hydrolyzed to a suitable form (i.e., an acid, alkali metal salt, ammonium or amine form), see U.S. Pat. Nos. 3,041,317, 3,560,568 and 3,624,053.

The foregoing perfluorinated monomers may also be co-grafted with other monomeric materials such as those monomers known to be susceptible to radiation grafting. For example, $\alpha, \beta, \beta$-trifluorostyrene can be co-grafted with $\alpha$-methylstyrene onto a base film and then sulfonated to form a useful membrane.

A preferred starting material is $\alpha, \beta, \beta$-trifluorostyrene (TFS). This material may be made in accordance with several well known methods, such as those described in U.S. Pat. Nos. 3,489,807, 3,449,449 and 2,651,627. This invention will be further illustrated utilizing this compound as the monomer.

It should be noted that the pure TFS is not required for this process. As the grafting will generally be done from solution due to economic considerations, commercial TFS containing other materials may be used. It is necessary, however, that the diluent be inert and a non-solvent for the base film. This means that the diluent must not either homopolymerize, nor copolymerize with the TFS under the radiation conditions of this process, nor adversely affect the radiation grafting.

The general procedure for the graft polymerization of TFS onto the base film, used in each of the following embodiments, is as follows. The film base, covered with an interlayer of paper and wound into a roll, is placed in a chamber. A solution of trifluorostyrene in a suitable solvent is then added to completely immerse the film base roll. A vacuum and nitrogen flush is applied and re-applied several times to remove any dissolved oxygen from the solution and chamber. The chamber, under a nitrogen atmosphere, is sealed. The temperature is kept sufficiently low during this procedure to prevent vaporization of the solvent. The film and trifluorostyrene solution, in the sealed chamber, are irradiated i.e. for about two weeks at a suitable dose rate, as discussed below. The grafted film is then removed from the chamber and washed and dried.

The grafting may be performed either using TFS in bulk or in solution. Generally, the solvent must have similar properties as described for the TFS diluent discussed above. Table I illustrates the grafting of TFS onto FEP film at different concentrations of TFS. The percentage of graft is determined by the difference between the weight of the final grafted film less the weight of the original base film, divided by the weight of the original base film.

TABLE I

GRAFTING OF TRIFLUOROSTYRENE AT DIFFERENT CONCENTRATIONS

| TFS Conc. | Benzene | Dose Rate | Total Dose | Graft |
|---|---|---|---|---|
| 10% | 90% | 7236 r/hr | 2.59 Mrad | 1.4% |
| 30% | 70% | 7236 r/hr | 2.59 Mrad | 8.2% |
| 50% | 50% | 7236 r/hr | 2.59 Mrad | 14.3% |
| 70% | 30% | 7236 r/hr | 2.59 Mrad | 24.0% |

As can be seen from Table I the amount of graft increases with the concentration of TFS. The amount of graft for membranes useful in chlor-alkali cells may vary widely, such as from 3 to 40%, and preferably from about 10 to 30% of TFS graft. Hence, the TFS concentration in the grafting procedure should be varied accordingly. Membranes designed for use in fuel cells should have a lower resistance than those used in chlor-alkali cells. This may be achieved by utilizing a greater percentage graft. Preferably such membranes will have about 20% to 50% of TFS graft. This may be achieved with a higher TFS concentration or by varying the dose rates.

The solvents for the grafting procedure may be aromatic compounds or halogenated compounds. Preferred solvents for the TFS and benzene and methylene chloride. Both solvents are inert and inexpensive. Methylene chloride has the further advantage of being non-flammable. The results of grafting in this solvent are shown in Table II.

TABLE II

GRAFTING OF TRIFLUOROSTYRENE IN METHYLENE CHLORIDE

| TFS Conc. | MeCl$_2$ | Dose Rate | Total Dose | % Graft |
|---|---|---|---|---|
| 10% | 90% | 7163 r/hr | 2.49 Mrad | 2.5 |
| 30% | 70% | 7163 r/hr | 2.49 Mrad | 9.7 |
| 50% | 50% | 7163 r/hr | 2.49 Mrad | 17.6 |
| 70% | 30% | 7163 r/hr | 2.49 Mrad | 27.1 |

A comparison of the results shown in Tables I and II indicates that the use of methylene chloride as a solvent leads to a greater degree of grafting than the use of benzene. Additives may be employed to increase the rate of grafting, such as the use of a minor amount of methanol with benzene.

As shown in Tables III and IV, the grafting of TFS onto the base film in dose and temperature dependent.

TABLE III

GRAFTING OF TRIFLUOROSTYRENE TO FEP FILM AT ROOM TEMPERATURE AND 60% TRIFLUOROSTYRENE IN BENZENE SOLUTION

| Dose Rate | Radiation Time | Total Dose | % Graft |
|---|---|---|---|
| 12,606 r/hr | 51.5 hrs. | 0.649 Mrad | 3.3% |
| 12,606 r/hr | 121.8 hrs. | 1.535 Mrad | 7.2% |
| 12,606 r/hr | 233.0 hrs. | 2.937 Mrad | 15.5% |
| 12,606 r/hr | 344 hrs. | 4.33 Mrad | 26.1% |
| 12,606 r/hr | 402 hrs. | 5.06 Mrad | 29.9% |

TABLE IV

GRAFTING OF TRIFLUOROSTYRENE AT DIFFERENT TEMPERATURES

| Temperature of Grafting | TFS Conc. In Benzene | Dose Rate | Total Dose | % Graft |
|---|---|---|---|---|
| −78° C | 25% | 7236 r/hr | 3.11 Mrad | 0.7% |
| 23° C | 25% | 7236 r/hr | 2.96 Mrad | 8.3% |

Generally the dose rate and temperature are not critical. It is possible to utilize dose rates in the range of about 5,000 r/hr up to about 300,000 r/hr. Preferably the dose rate is kept below about 100,000 r/hr. Too great a total dose may cause degradation of the base film. Generally a total dose within the range of about 0.1 to 10 Mrad is useful, while a range of about 0.7 to 5 Mrad is preferable. Higher dose rates also yield lower percentage grafts for the same total dose. The temperature may also be widely varied within the range of −78° C to 60° C; room temperature is preferred for convenience of operations.

As noted above TFS can be grafted onto many base film materials, in addition to the FEP base film of the previous examples. Results obtained with several base films are shown in Table V.

TABLE V

GRAFTING OF TRIFLUOROSTYRENE IN OTHER BASE FILMS

| Polymeric Film | TFS Conc. In Benzene | Dose Rate | Total Dose | % Graft |
|---|---|---|---|---|
| Teflon | 25% | 7236 r/hr | 2.24 Mrad | 6.8% |
| High Density PE | 25% | 7236 r/hr | 2.24 Mrad | 5.7% |
| Polypropylene | 25% | 7236 r/hr | 2.24 Mrad | 2.1% |
| FEP Laminate* | 25% | 7236 r/hr | 2.24 Mrad | 6.0% |

*2 mil FEP/2 mil glass/2 mil FEP

Sulfonation of TFS resin has been carried out previously by dissolving the resin in suitable solvents prior to sulfonation, see U.S. Pat. No. 3,341,366. The present method allows sulfonation to be performed in situ on the grafted membrane with suitable sulfonating agents, such as chlorosulfonic acid and fluorosulfonic acid.

The grafted membrane is first worked in a suitable solvent for TFS, such as methanol, benzene or methylene chloride, and then dried at about 50° C to 60° C for about ½ to 1 hour.

A sulfonating bath is prepared by dissolving from 5 to 50% and preferably about 30% chlorosulfonic acid in a halogenated solvent such as carbon tetrachloride. The solvent should not be volatile at the sulfonation temperature and should not be sulfonatable. Generally the lower concentration chlorosulfonic acid baths are used when a sulfonated linear product is desired and the higher concentration baths are used when a cross-linked product is desired. A higher sulfonation temperature also promotes cross-linking.

The membrane is then introduced into and allowed to dwell in the bath. The grafted film is left in the chlorosulfonic acid solution for a suitable period of time at an elevated temperature, i.e. for about 20 to 60 minutes, or longer, at about 130° to 155° C. The amount of sulfonation may be in the range of about .5 to about 25% as determined by the difference between the final weight of the sulfonated grafted film less the weight of the grafted film, divided by the weight of the grafted film. The film is then removed and boiled in water to convert the sulfonate groups to the acid form. The film is then added to an alkali metal hydroxide solution, such as 4–5% solution of potassium hydroxide to obtain the salt form. It has also been found that a final treatment in an anionic emulsifier is desirable to lower the resistance of the film.

The results for various dwell times of the grafted film in the chlorosulfonic acid bath for a 17% grafted membrane are shown in Table VI.

Instead of realizing a continuous weight gain with increasing time and temperature, it was found that generally sulfonation gradually decreases with time as shown in Table VI. The electrical resistance of the film, as measured in 40% KOH, goes through a minimum, so that the electrical resistance of the membrane (such as from 0.2 to 2 ohms per square inch) can be controlled by modification of residence time during sulfonation. This reduction in weight and change in electrical resistance may be due to the formation of sulfones.

The hydroxyl ion diffusion across the membrane is another important property of the membrane, since the membrane should retard the diffusion of hydroxyl ions across the membrane to the anode. In the following tests the diffusion of hydroxyl ions is measured in a dialyser cell in which one side is filled with 2.5 M NaOH and the other side with distilled water. The concentration of OH⁻ ion in the distilled water side is plotted against time. The flux of OH⁻ is calculated from the slope of the plot as:

$$J = \frac{c}{t} \; \frac{V}{A}$$

where J is the OH⁻ flux in moles/in²-min
 $c/t$ is the slope of the pH time plot
 V is the volume of half cell in liters
 A is the membrane area exposed in in². J can be converted to units of gram/in²-hr by multiplying by a factor of $2.4 \times 10^3$. The diffusion of OH⁻ ions across various membranes is given in Table VII. The data is presented for TFS grafted membranes made in accordance with the present invention and conventionally grafted styrene membranes; the base film used was 2 mil FEP.

TABLE VI

SULFONATION OF TRIFLUOROSTYRENE GRAFTED 5 MIL FEP FILM

| Temperature | Residence Time | % Weight Gain | Electrical Resistance 40% KOH |
|---|---|---|---|
| 130° C | 10 minutes | 8.3% | 0.97 ohm-in² |
| 140° C | 10 minutes | 8.5% | 0.89 ohm-in² |
|  | 20 | 7.1% | 0.56 |
|  | 30 | 8.5% | 0.54 |
|  | 60 | 7.8% | 0.87 |
|  | 150 | 7.5% | 1.10 |
|  | 300 | 5.6% | 1.00 |
| 155° C | 10 minutes | 8.5% | 0.64 |
|  | 30 | 7.9% | 0.49 |
|  | 60 | 7.8% | 0.53 |
|  | 150 | 7.1% | 0.80 |
|  | 300 | 6.9% | 1.80 |

TABLE VII

HYDROXYL ION DIFFUSION IN GRAFTED MEMBRANES

| SAMPLE | % Graft | % Sulfonation | Resistance (ohm-in$^2$) | OH-FLUX (Mole/in$^2$-min) |
|---|---|---|---|---|
| TFS | 26.0 | 8.0 | 0.500 | $1.6 \times 10^{-5}$ |
| TFS | 32.9 | 8.8 | 0.446 | $1.8 \times 10^{-5}$ |
| TFS | 17.4 | 7.5 | 5.30 | $2.1 \times 10^{-9}$ |
| Styrene | 32.0 | 23.0 | 0.225 | $4.7 \times 10^{-5}$ |
| Styrene | 20.0 | 14.0 | 1.86 | $5.4 \times 10^{-6}$ |
| Styrene | 16.0 | 11.0 | 2.50 | $3.2 \times 10^{-6}$ |

From a purely back diffusion point of view, the smaller the J values, the better the membrane. However, the smaller J value follows from a high electrical resistance. Therefore, a suitable balance between resistance and flux should be chosen for the membrane in accordance with the desired end-use of the membrane.

The resistance to oxidation of a membrane is a very important property since it is related to the life of the cell. The screening test used to determine relative life involves ferrous ion catalyzed hydrogen peroxide degradation as described by Hodgdon (R. B. Hodgdon, J. Polymer Science, Part A-1, 171 (1968)). The membrane to be tested is added to 50 ml of a 3% hydrogen peroxide solution containing 1 ppm of ferrous ion. The mixture is kept at 70° C for 24 hours. The electrical resistance in 40% KOH is measured before, $R_o$, and after, $R_f$, the oxidation test. The weight loss under the conditions of these tests was also measured. The data in Table VIII is for TFS grafted membranes made in accordance with the present invention and conventionally grafted styrene membranes; the base film used was 2 mil FEP.

TABLE VIII

OXIDATION STABILITIES OF GRAFTED MEMBRANES

| SAMPLE | % GRAFT | % SULFONATION | $R_o$ (ohm-in$^2$) | $R_f$ (ohm-in$^2$) | % WT. LOSS |
|---|---|---|---|---|---|
| TFS | 25.6 | 8.8 | 0.23 | 3.9 | 17.4 |
| TFS | 25.6 | 12.0 | 0.24 | 2.8 | 18.3 |
| TFS | 32.9 | 8.8 | 0.50 | 1.67 | 9.9 |
| TFS | 32.9 | 8.8 | 0.44 | 0.90 | — |
| TFS | 32.9 | 8.8 | 0.45 | 1.28 | — |
| Styrene | 20.2 | 14.1 | 0.20 | 4.0 | 24.6 |
| Styrene | 20.2 | 14.1 | 0.23 | 4.4 | — |

As can be seen, the final resistance of the styrene-SO$_3$H membranes was higher than the TFS-SO$_3$H membrane. In addition, the weight loss of styrene-SO$_3$H was also much larger under this very severe test. Most of the TFS-SO$_3$H membranes still have a resistance below 3 ohm-in$^2$ and are considered to be operational but the styrene-SO$_3$H membranes would require too high a voltage in operation.

The electrolytic cells containing the ion exchange membranes of the present invention may be used for effecting the electrochemical decomposition of a number of ionizable compounds. Exemplary of the various solutions of ionizable compounds which may be electrolyzed and the products produced are aqueous solutions of alkali metal halides to produce alkali metal hydroxides and halogens; aqueous solutions of HCl to produce hydrogen and chlorine; aqueous solutions of ammonium sulfate to produce persulfates; aqueous solutions of borax to produce perborates; aqueous solutions of alkali metal hydroxides, when using an oxygen cathode, to produce peroxides; etc. Of these, the most preferred are aqueous solutions of alkali metal halides, particularly sodium chloride, and aqueous solutions of HCl. Typically, the solutions of these ionizable compounds are introduced into the anode compartment of the cell in which the electrolysis takes place.

In a typical process, utilizing a sodium chloride brine as the feed to the anode compartment, the feed solution may contain from about 200 to 325 grams per liter sodium chloride. Preferably, the anolyte liquor has a pH in the range of about 1 to 5, with a pH within the range of about 2.5 to 4.0 being particularly preferred. This pH of the anolyte solution may be attained by the addition of hydrochloric acid to the feed brine solution, typically in amounts of about 2 to 10% by weight. In general, the cells may be operated over a wide temperature range, e.g., from room temperature up to the boiling point of the electrolyte although temperatures of from about 65° to 90° C are preferred. Similarly, a wide variation in the electrical operating conditions are also possible, with cell voltages of from about 0.5 to 4 amps per square inch being suitable. The concentration of the sodium hydroxide concentrations of from about 24 to 33% by weight being preferred. Typically, the sodium hydroxide recovered from the cathode compartment contains less than about 1% by weight of sodium chloride while chlorine is produced in the anode compartment at a current efficiency in excess of about 95%.

In accordance with the foregoing procedure, six samples of TFS grafted FEP film were tested in a chlorine cell. All samples were preboiled for 15–20 minutes before the test. The cell used was a standard two compartment glass minicell operated between 85°–95° C. The anolyte was circulated with acidified brine at a pH of 2.0. The catholyte was 100 gm/liter sodium hydroxide.

The resistance of each membrane was determined using an AC bridge. The initial voltage for the cell was determined at 2 ASI and 100 gm/liter caustic strength 85°–95° C. The cell was operated and the cell voltaged determined at various times, and corrected to the initial conditions of 100 gm/liter sodium hydroxide and the rate of voltage increase calculated. The results are summarized in Table IX.

TABLE IX

| NO. | % GRAFT | SULFONATION TEMPERATURE (°C) | % SULFONATION | SULFONATION TIME (HRS.)* | RESISTANCE ohm/in² | INITIAL VOLTAGE | OPERATION TIME (HRS) | FINAL VOLTAGE | RATE of INCREASE mv/hr |
|---|---|---|---|---|---|---|---|---|---|
| 1. | 17.4 | 155 reflux | 7.1 | 2.5 | 0.8 | 3.42 | 170 | 4.93 | 9.0 |
| 2 | 17.4 | 140 | 7.5 | 2.5 | 1.1 | 3.45 | 129 | 5.25 | 12.7 |
| 3 | 17.4 | 155 | 7.0 | 5.0 | 1.8 | 3.75 | 520 | 5.14 | 0.28 |
| 4 | 17.4 | 140 | 8.9 | 0.5 | 0.6 | 3.37 | 543 | 5.69 | 0.31 |
| 5 | 21.37 | 140 | 9.0 | 0.5 | 0.342 | 3.00 | 555 | 4.50 | 1.04 |
| 6 | 46.2 | 140 | 12.0 | 0.5 | 0.220 | 2.89 | 384** | 3.18 | 0.71 |

*in a 30% chlorosulfonic acid bath
**Brittleness

The "Operation Time" in the table for samples 1–5 was the lifetime during which the cell voltage was less than 4.5 volts.

A cell voltage of 4.5 volts at 2 ASI does not necessarily mean the membrane had to be removed from the test. Depending on power costs, higher cell voltages might be economical. Also lower cell voltage could be obtained by decreasing the current density. The selection of 2 ASI as an operating current density was used as a method of screening. At lower current densities the voltage-time rise would be lower and correspondingly longer time would be projected for the membrane to reach a given cell voltage.

The "Rate Of Increase" in cell voltage was determined from the linear portion of the variation in cell voltage which occurred after an initially higher rate of increase and prior to a sharp rise prior to termination of the test. For example, for samples 3 and 4, the respective initial rates of increase were 0.60 mv/hr and 1.70 mv/hr each after about 135 hours. FIG. 1 is a plot of the voltage characteristics as a function of operating time for sample 4.

The use of the membrane of this invention in fuel cells may be illustrated as follows. Place the membrane in abutting relationship between two fuel cell electrodes in a conventional fuel cell configuration. The faces of the electrodes away from the membrane respectively form the sides of compartments for reactants and products of the fuel cell process, i.e. see U.S. Pat. No. 3,341,366. The electrodes may be made of platinum black and a binding agent, by techniques well known in the art. The electrodes are bonded to the membrane by the application of an elevated temperature and pressure, i.e. 250° F and 450 psi. Hydrogen gas is supplied at the anode and oxygen gas at the cathode and current is drawn from the cell by leads affixed to the electrodes.

The membranes of this invention can also be used to prepare anionic exchange membranes. The procedures for this are analogous to those used for conventional styrene based anionic membranes as reported in the literature. This can be achieved, for example, with a TFS grafted membrane, by the standard chemical sequence of halomethylation, amination and quaternization, or by a nitration and reduction route.

In addition to the radiation technique for grafting the perfluoro monomers described above, it has been found that these monomers may be polymerized by radiation either in bulk or in solution. The technique of radiation polymerization has the advantage over conventional catalyzed polymerization (with peroxides or persulfates) in producing a purer product, i.e., free of catalyst residues both physically admixed and chemically combined. Generally the conditions set forth above for grafting may be followed for polymerization and also for sulfonation. Using a Cobalt-60 source at room temperature, the following results were obtained.

TABLE X

| RADIATION POLYMERIZATION OF TRIFLUOROSTYRENE | | | | |
|---|---|---|---|---|
| TFS Conc. | Benzene Conc. | Dose Rate | Total Dose | Polymer Yield |
| 50 | 50% | 7236 r/hr | 1.98 Mrad | 0.6% |
| 100 | 0% | 7236 r/hr | 1.98 Mrad | 1.4% |

This invention has been described in terms of specific embodiments set forth in detail. Alternative embodiments will be apparent to those skilled in the art in view of this disclosure, and accordingly such modifications are to be contemplated within the spirit of the invention as disclosed and claimed herein.

What is claimed is:

1. A membrane adapted for use in electrochemical cells comprising:
    a. an inert polymeric base film; and
    b. sulfonated α, β, β-trifluorostyrene irradiation grafted on said film.

2. A membrane according to claim 1 wherein said inert polymeric base film is selected from the group consisting of polypropylene film, polyethylene film, polytetrafluoroethylene film, polytrifluorochloroethylene film, tetrafluoroethylene-hexafluoropropylene copolymer film, tetrafluoroethylene-ethylene copolymer film and laminated films thereof.

3. A membrane according to claim 1, wherein the percentage graft is in the range of about 3 to about 50%.

4. A membrane according to claim 3, wherein the percentage sulfonation is in the range of about 5 to about 25%.

5. A process for the preparation of a membrane suitable for use in electrochemical cells comprising:
    a. forming a solution of α, β, β-trifluorostyrene in an inert organic solvent;
    b. placing said solution in contact with an inert polymeric film;
    c. irradiating said contacted film to graft polymerize said trifluorostyrene onto the film;

d. removing excess solution from said film; and e. sulfonating said grafted film.

6. A process according to claim 5 wherein said irradiating is with gamma radiation at a total radiation dose of about 0.1 to about 10.0 Mrad.

7. A process according to claim 5, wherein the organic solvent is selected from the group consisting of aromatic compounds and halogenated compounds.

8. A process according to claim 5, wherein the organic solvent is selected from the group consisting of benzene and methylene chloride.

9. A process according to claim 5, wherein the irradiating is carried out at a temperature in the range of about −78° C to about 60° C.

10. A process according to claim 5, wherein the sulfonation step is carried out by:

a. forming a solution of halosulfonic acid which has a concentration in the range of about 5 to about 50%; and b. immersing said grafted film in said solution.

11. A method for the grafting of a perfluorinated vinyl monomer onto an inert polymeric film comprising:

a. placing the perfluorinated vinyl monomer in contact with the inert polymeric film, b. irradiating the contacted film with gamma radiation at a total radiation dose of about 0.1 to about 10.0 Mrad.

12. A membrane adapted for use in an electrochemical cell comprising:

a. an inert polymeric film b. a perfluoro vinyl monomer irradiation-grafted on said film, and c. a pendant ion-exchange group on said vinyl monomer.

* * * * *

UNITED STATES PATENT AND TRADEMARK OFFICE
CERTIFICATE OF CORRECTION

PATENT NO. : 4,012,303
DATED : March 15, 1977
INVENTOR(S) : Vincent F. D'Agostino, Joseph Y. Lee and Edward H. Cook, Jr.

It is certified that error appears in the above-identified patent and that said Letters Patent are hereby corrected as shown below:

Column 6, line 3, delete the word "and" (first occurrence) and substitute --are--.

Signed and Sealed this

Fourteenth Day of June 1977

[SEAL]

Attest:

RUTH C. MASON
*Attesting Officer*

C. MARSHALL DANN
*Commissioner of Patents and Trademarks*